(12) United States Patent  
Chongoushian (10) Patent No.: US 10,158,431 B2  
(45) Date of Patent: Dec. 18, 2018

(54) DYNAMIC RELAY ASSIGNMENT FOR JAMMING MITIGATION IN WIRELESS NETWORKS

(71) Applicant: BAE SYSTEMS Information and Electronic Systems Integration Inc., Nashua, NH (US)

(72) Inventor: John H Chongoushian, Emerson, NJ (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 15/496,552

(22) Filed: Apr. 25, 2017

(65) Prior Publication Data

US 2018/0309523 A1    Oct. 25, 2018

(51) Int. Cl.
*H04B 7/14* (2006.01)
*H04B 15/00* (2006.01)
*H04W 24/10* (2009.01)

(52) U.S. Cl.
CPC ............ *H04B 15/00* (2013.01); *H04B 7/14* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 4,751,701 A | 6/1988 | Roos et al. | |
| 5,832,379 A * | 11/1998 | Mallinckrodt | H04B 7/18532 455/427 |
| 5,987,320 A * | 11/1999 | Bobick | H04W 24/00 455/63.1 |
| 6,353,729 B1 * | 3/2002 | Bassirat | H04W 52/24 455/11.1 |
| 6,556,832 B1 * | 4/2003 | Soliman | H04W 16/18 455/456.5 |
| 6,779,009 B1 | 8/2004 | Zuber | |
| 7,020,701 B1 | 3/2006 | Gelvin et al. | |

(Continued)

OTHER PUBLICATIONS

International Search Report, PCT/US17/52242 dated Nov. 29, 2017, 11 pages.

(Continued)

*Primary Examiner* — Lana N Le
(74) *Attorney, Agent, or Firm* — Maine Cernota & Rardin (57) ABSTRACT

A method for mitigating the effect of a localized jamming attack on a secure, tactical wireless network implements a dynamic relay assignment ("DRA") approach, whereby nodes are dynamically assigned to relay communications to "disadvantaged" nodes that are subject to the attack, the relay nodes being selected based on their communication reliability and their proximity to the disadvantaged nodes. In embodiments, the nodes share with each other performance statistics and, in embodiments, measured local noise levels. In various embodiments, each node provides data to a "strategy optimizer" which then dynamically makes relay assignments. In Link-16 embodiments support for a "DRA" relay mode is added, and the communication protocol is extended to support the required exchange of communication quality and local noise information via PPLI messages.

11 Claims, 5 Drawing Sheets

(56) References Cited

U.S. PATENT DOCUMENTS

| | | | | |
|---|---|---|---|---|
| 7,187,664 | B2* | 3/2007 | Hiltunen | H04B 1/109 370/318 |
| 7,190,741 | B1* | 3/2007 | Manning | H04B 1/1027 375/227 |
| 7,308,005 | B1* | 12/2007 | Roggendorf | H04L 12/66 370/326 |
| 7,313,143 | B1* | 12/2007 | Bruno | G08G 5/0013 342/36 |
| 7,813,695 | B2* | 10/2010 | Haartsen | H04B 7/2606 455/11.1 |
| 8,032,032 | B2 | 10/2011 | Chand et al. | |
| 8,995,902 | B2 | 3/2015 | Reiss | |
| 9,066,311 | B1 | 6/2015 | Sherman | |
| 9,250,312 | B1* | 2/2016 | Knibbe | G01S 5/163 |
| 9,451,558 | B2 | 9/2016 | Zhu | |
| 9,668,228 | B2 | 5/2017 | Kim | |
| 2002/0172166 | A1* | 11/2002 | Arslan | H04L 1/20 370/317 |
| 2003/0058959 | A1 | 3/2003 | Rafie et al. | |
| 2030/0101034 | | 5/2003 | Tillotson | |
| 2004/0017824 | A1 | 1/2004 | Koenck et al. | |
| 2005/0003976 | A1 | 1/2005 | Haze et al. | |
| 2005/0059422 | A1 | 3/2005 | Rudolf | |
| 2007/0150631 | A1 | 6/2007 | Druke et al. | |
| 2008/0274702 | A1* | 11/2008 | Keller | G01R 29/0871 455/67.13 |
| 2010/0002596 | A1* | 1/2010 | Wu | H04W 52/143 455/67.11 |
| 2010/0007554 | A1* | 1/2010 | Wang | G01S 19/02 342/357.29 |
| 2010/0086088 | A1* | 4/2010 | Lie | H04B 1/7117 455/63.1 |
| 2010/0098036 | A1 | 4/2010 | Li | |
| 2010/0296492 | A1 | 11/2010 | Jain | |
| 2011/0032191 | A1 | 2/2011 | Cooke et al. | |
| 2011/0128902 | A1 | 6/2011 | Guo | |
| 2011/0244786 | A1* | 10/2011 | Fujii | H01Q 19/10 455/7 |
| 2013/0033998 | A1* | 2/2013 | Seo | H04W 24/00 370/252 |
| 2014/0006575 | A1 | 1/2014 | Subramanian | |
| 2014/0050088 | A1 | 2/2014 | Song et al. | |
| 2014/0050142 | A1 | 2/2014 | Song et al. | |
| 2014/0286168 | A1 | 9/2014 | Amano et al. | |
| 2016/0021596 | A1 | 1/2016 | Hui et al. | |
| 2016/0262151 | A1 | 9/2016 | Chongoushian | |
| 2018/0159763 | A1 | 6/2018 | Srinivasan | |

OTHER PUBLICATIONS

Northrup Grumman Corporation, Understanding Voice and Data Link Networking, Dec. 2014, Guidebook, Distributed by Northrup Grumman, 9326 Spectrum Center Blvd, San Diego, CA 92123-1433, Document No. 135-02-005, 320 pages.

International Search Report, PCT/US18/30129, dated Jul. 13, 2018, 13 pages.

Camana, O., "Finding the Path Forward to Interoperability of the Emerging Link 16 Upgrades", Article [online]. Jan. 4, 2014 [retrieved on Jun. 25, 2018]. Retrieved from Internet: <URL:https://static1.squarespace.com/static/5274112ae4b02d3f058d4348/t/5473cbe4b0a883cf0d7c7d/1416874604915/2014-1-4b.pdf>slide 13.

* cited by examiner

DYNAMIC RELAY ASSIGNMENT FOR JAMMING MITIGATION IN WIRELESS NETWORKS

STATEMENT OF GOVERNMENT INTEREST

The invention was made with United States Government support under Contract No. FA8750-11-C-0189 awarded by the US DEPARTMENT OF THE AIR FORCE. The United States Government has certain rights in this invention.

FIELD OF THE DISCLOSURE

The following disclosure relates generally to secure wireless network communications, and more particularly to methods for mitigating jamming attacks in tactical wireless communication networks.

BACKGROUND

Wireless communication networks are critically important for maintaining coordination and intercommunication between elements of mobile combat assets. Frequently, it is necessary during a mission to maintain communications over large distances, which can require that transmissions be relayed to their final destinations. This can be enabled by assigning nodes within the network to function as active relays. Of course, it is important that secure, tactical networks remain resilient in the presence of jamming threats.

An example of a wireless network with good anti-jamming ("AJ") features for secure military communication between mobile assets is the Link 16 networking protocol. Link 16 is a widespread tactical wireless networking system that is used by frontline land, air, and naval systems in the United States, NATO, and allied nations to allow multiple users to share situational awareness data.

Information is transmitted on a Link 16 network in TDMA timeslots that repeat every frame, or "epoch." The total number of timeslots included in a Link 16 network can be divided into subsets that represent virtual subnetworks, also referred to as "subnets." Each subnet is distinguished according to the subset of the Link 16 time slots that belongs to the subnet, as well as by the participants that share the subset of time slots. Link 16 subnets are also differentiated by their frequency-hopping patterns. Multiple subnets in a network can be "stacked" or "multinetted" by allowing time slots to be used redundantly, with the data transmitted in each net on different frequencies (FDMA) and possibly also with different coding (CDMA).

Figure 1:
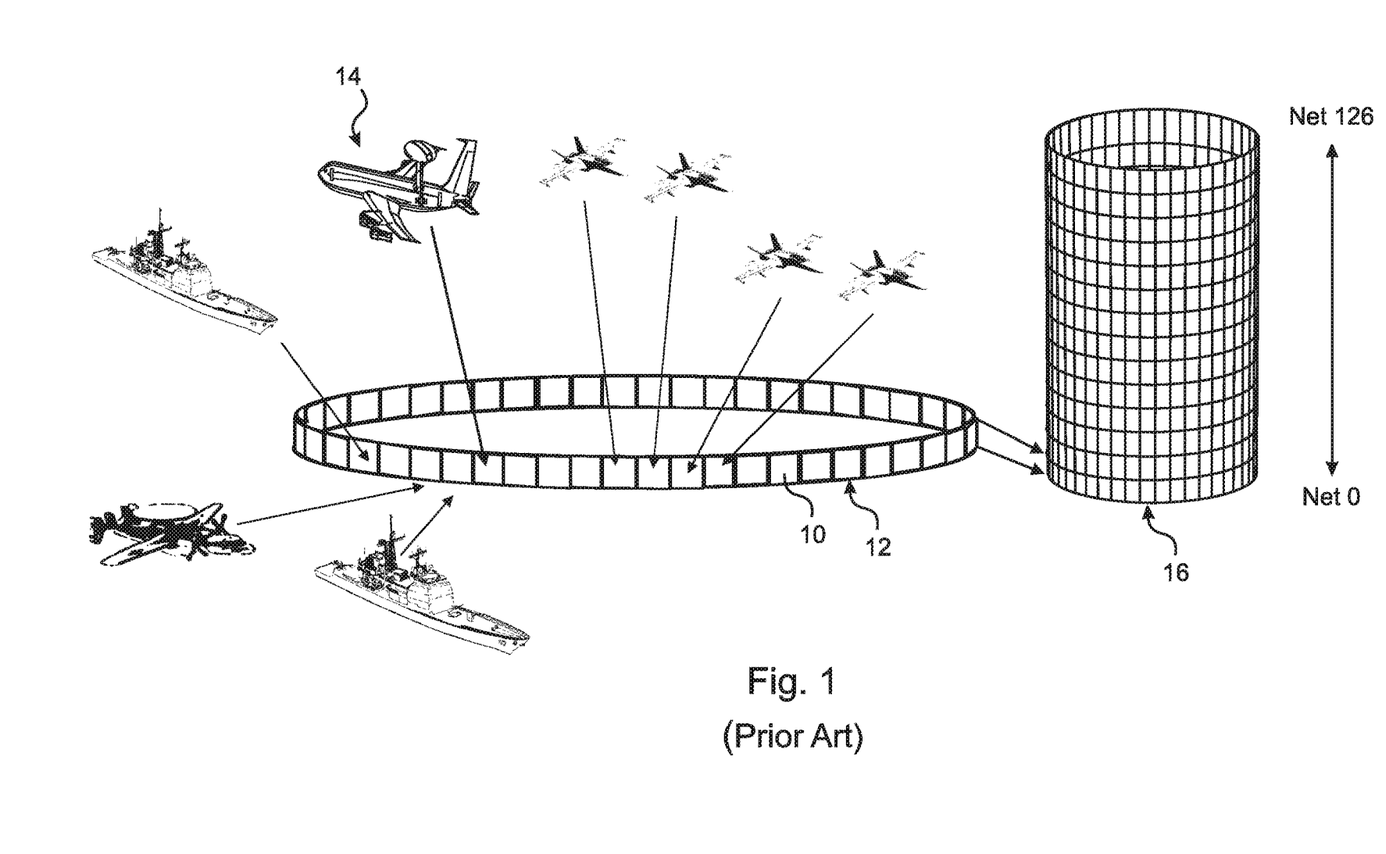
FIG. 1 is a graphical illustration of a typical Link 16 network architecture of the prior art.

A typical link 16 network is shown in FIG. 1. The blocks 10 in the ring 12 are time slots. Each participant 14 is provided transmit and receive time slot assignments by a network planner (not shown) prior to start of a mission. The column 16 to the right of the ring 12 illustrates the ability for Link 16 to operate on multiple nets (shown as stacked rings in the column 16). Each of the rings in the column 16 can be replaced, allowing users to form sub-networks or subnets allowing them to exchange data using different CDMA and FDMA codes to expand the capability of the network.

Each Link 16 participant terminal is initialized with a unique identifier, known as the Source Track Number (STN), along with time slot assignments that indicate which time slots are to be used for transmitting and receiving. Time slots can also be assigned for relaying of information by designated relay nodes in the network.

Given that the transmit power for Link 16 radios is typically 200 Watts, and the communications range for Link 16 is approximately 300 nautical miles, relays are almost always required for large operational areas. Currently, the relay assignments are established in advance, during network design, and time slots are assigned for the relay function as part of the network design. Currently, the Link 16 protocol defines three relay modes, which are "unconditional," "conditional," and "suspended." Nodes that are assigned to the unconditional relay mode always relays messages received in the assigned relay time slots, regardless of location. Nodes that are assigned to the suspended mode never serve as relays.

Nodes that are assigned to the conditional relay mode are instructed to relay messages as needed, and are selected at any given moment according to which of the conditional relay nodes has the greatest geographical coverage at that time, as defined by its height and range, which are reported in Precise Participant Location and Identification (PPLI) messages exchanged between the nodes. Details of the construction of the PPLI messages can be found in MIL-STD-6016. Typically, relay nodes are selected based on bandwidth availability, based purely on node location, or on some other, somewhat arbitrary basis. In the case of aircraft, the selected conditional relay node is often the one with the highest altitude.

Despite its inherent anti-jamming features, the effective communication range of a Link-16 network can nevertheless be significantly reduced by an interfering adversary transmitting a focused, localized, high power jamming signal toward the Link-16 nodes.

What is needed, therefore, is a method for maximizing the effective communication range of a wireless, tactical communication network such as a Link-16 network when nodes in the network are subjected to a high power, localized interference signal.

SUMMARY

A method is disclosed for maximizing the effective communication range of a wireless, tactical communication network such as a Link-16 network when nodes in the network are subjected to a high power, localized interference signal.

The disclosed method is able to mitigate jamming attacks that transmit focused, directional interfering signals, whereby the effect of the attack varies significantly between nodes of the network according to their locations relative to the spatial region that is being jammed.

The disclosed method uses a dynamic relay assignment ("DRA") approach, whereby a conditional relay node in the network is assigned to function as a relay based on its "quality level" ("QL"), which is a measure of the communication reliability of a node, and also on its proximity to nodes that are considered "disadvantaged," in that they are located within a region of high interference and are experiencing a reduced communications range.

According to the disclosed method, rather than basing relay decisions purely on node locations, predicted network traffic levels, or some other external factor, information provided by the network itself regarding actual network conditions such as measured signal to noise values and message error rates are used to determine when to enable a relay and which nodes to select as relay nodes for retransmission of messages.

In embodiments, each node in the network collects statistics on its communication performance and also makes measurement of the local noise level, and then shares this data with other nodes in the network, for example via PPLI messages in the case of a Link-16 network. Using data measured locally and data received from other nodes in the network, each node calculates its "node quality" ("NQ"). A connectivity table is built, and QL scores are assigned to the nodes that are available for DRA assignment, where the QL depends on a comparison of the NQs and on other factors such as proximity of a node to disadvantaged nodes. Based on the QL scores, a determination is made as to which, if any, of the DRA-capable nodes should act as relay platforms.

In various embodiments, each node in the network provides its NQ and/or QL score to a "strategy optimizer" ("SO"), which then determines which, if any, of the DRA-capable nodes should be assigned to act as a relay.

In embodiments where the disclosed DRA functionality is implemented in a Link-16 network, the Link-16 protocol is extended to include support for exchange via PPLI messages between nodes of the required quality scores and ambient noise measurements, and support is added to the Link-16 protocol for a "DRA" relay mode, in addition to the other three relay modes that are standard in Link-16.

One general aspect of the present disclosure is a method for enabling a transmitting node to communicate with a disadvantaged node of a wireless communication network, said disadvantaged node being a node in the network that is subject to localized interference that is present within a jammed region. The method includes, for each of a plurality of candidate nodes in the network, determining a quality level applicable to applicable to the candidate node, said quality level being dependent at least in part on a communication reliability of the candidate node and a proximity of the candidate node to the disadvantaged node, according to the quality levels of the candidate nodes, designating a node from among the plurality of candidate nodes as a relay node, and relaying by the relay node of a communication between the transmitting node and the disadvantaged node.

In embodiments, the method further includes determining by each of the candidate nodes of a noise level applicable to that node.

In any of the above embodiments, determining the quality level for a candidate node can include determining a node quality for the candidate node, the node quality being dependent upon at least one of:
  a rate at which the candidate node is receiving messages;
  a success rate at which the candidate node is receiving the messages;
  an average signal-to-noise ratio of the messages received by the candidate node; and
  a noise level applicable to the candidate node.

In some of these embodiments, determining the quality level for a candidate node includes determining the node quality of a closest candidate node, where the closest candidate node is the candidate node from among the plurality of candidate nodes that is closest to the transmitting node. And in any of these embodiments, determining the quality level for a candidate node can include determining a relay quality for the candidate node, the relay quality being dependent upon at least one of:
  the node quality of the candidate node;
  a number of disadvantaged nodes in the network;
  a distance between the candidate node and the disadvantaged node or, if the network includes a plurality of disadvantaged nodes, an average distance between the candidate node and the plurality of disadvantaged nodes; and
  a transmit power of the candidate node.

And in some of these embodiments, determining the quality level for a candidate node includes determining the relay quality of a closest candidate node, where the closest candidate node is the candidate node from among the plurality of candidate nodes that is closest to the transmitting node.

In any of the above embodiments, determining the quality level for a candidate node can include determining how many of the candidate nodes are within a communication range of the transmitting node.

In any of the above embodiments, the network can be a Link-16 network. Some of these embodiments further include sharing among nodes of the network via PPLI messages of information regarding at least one of:
  noise levels applicable to the nodes;
  statistics regarding rates at which the nodes are receiving messages;
  statistics regarding success rates at which the nodes are receiving the messages;
  average signal-to-noise ratios of messages received by the nodes;
  locations of the nodes;
  transmit powers of the nodes; and
  relay modes of the nodes.

In any of these embodiments, determining the quality level applicable to each of the candidate nodes can include providing by an interference recognizer of at least one of a number of received messages, a message success rate, an average signal to noise ratio of received messages, and a measurement of ambient noise applicable to the candidate node.

And in any of these embodiments, the Link-16 network can be configured to include dynamic relay assignment ("DRA") as a relay mode applicable to nodes in the network.

Another general aspect of the present disclosure is non-transitory media containing software operable on nodes in a wireless communications network so as to enable a transmitting node of the network to communicate with a disadvantaged node of the network, said disadvantaged node being a node in the network that is subject to localized interference that is present within a jammed region. The software is configured to cause the nodes of the network to operate and interact such that for each of a plurality of candidate nodes in the network, a quality level applicable to that candidate node is determined, said quality level being dependent at least in part on a communication reliability of the candidate node and a proximity of the candidate node to the disadvantaged node, a node from among the plurality of candidate nodes is designated as a relay node, the relay node being selected according to the quality levels of the candidate nodes, and the relay node relays a communication between the transmitting node and the disadvantaged node.

Still another general aspect of the present invention is an apparatus configured for participation as a node in a wireless communication network. The apparatus includes at least one processor, wherein the processor has a user interface, a transceiver in electronic communication with the user interface, at least one antenna coupled to the transceiver, and non-transient software operable on the at least one processor and able to direct the at least one processor to:
  monitor non-relayed messages received by the receiver;
  determine from the received, non-relayed messages a communication reliability for the node;
  based on received messages from at least one other node, determine a relative location of a disadvantaged node in the network;

direct the transmitter to transmit said communication reliability and relative location information to a controlling node in the network;

process a control message from the controlling node that is received by the receiver; and direct the transmitter to relay network messages received by the receiver to the disadvantaged node if instructed to do so by the control message received from the controlling node.

In embodiments, the determined non-relayed message quality is dependent at least in part upon at least one of:

a rate at which the non-relayed messages are received;

a success rate at which the non-relayed messages are received;

an average signal-to-noise ratio of the non-relayed messages that are received; and a noise level applicable to the non-relayed messages that are received.

Implementations of the techniques discussed above may include a method or process, a system or apparatus, a kit, or a computer software stored on a computer-accessible medium. The details or one or more implementations are set forth in the accompanying drawings and the description below. Other features will be apparent from the description and drawings, and form the claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The present disclosure relates to a method for maximizing the effective communication range of a wireless, tactical communication network such as a Link-16 network when nodes in the network are subjected to a high power, localized interference signal.

Figure 2:
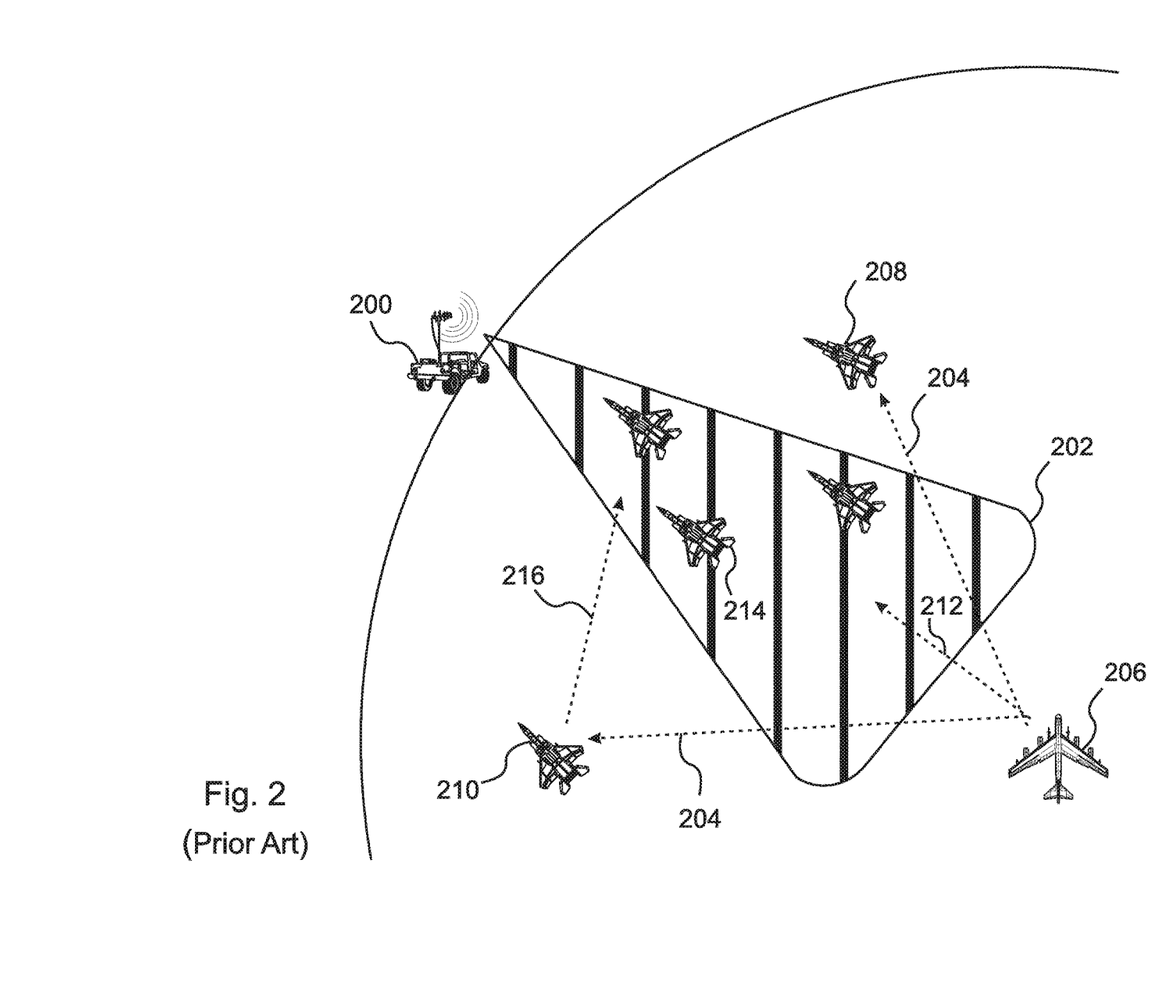
FIG. 2 is a graphical illustration from above that illustrates a flight of military aircraft subject to a focused jamming attack according to the prior art.

With reference to FIG. 2, the disclosed method is able to mitigate jamming attacks whereby an antagonist 200 transmits a focused, directional interfering signal 202, the effect of which varies significantly between nodes of the network according to their locations relative to the spatial region 202 that is being jammed. For example, transmissions 204 from a node 206 that is originating or relaying a message may be reliably detected by nodes 208, 210 that are relatively far away but lie outside of the region 202 of strongest interference, and yet similar transmissions 212 may not be able to reach nodes 214 that are much closer, but are within the jammed region 202.

In such cases, existing relay functions that do not take the jamming environment into account, such as the existing Link-16 "conditional" relay mode, may not be able to overcome the problem. For example, the node 210 at the highest altitude may be within the jammed environment, or, as shown in FIG. 2, it may be too far away from the disadvantaged nodes 214 to be able to reliably communicate with them.

Figure 3:
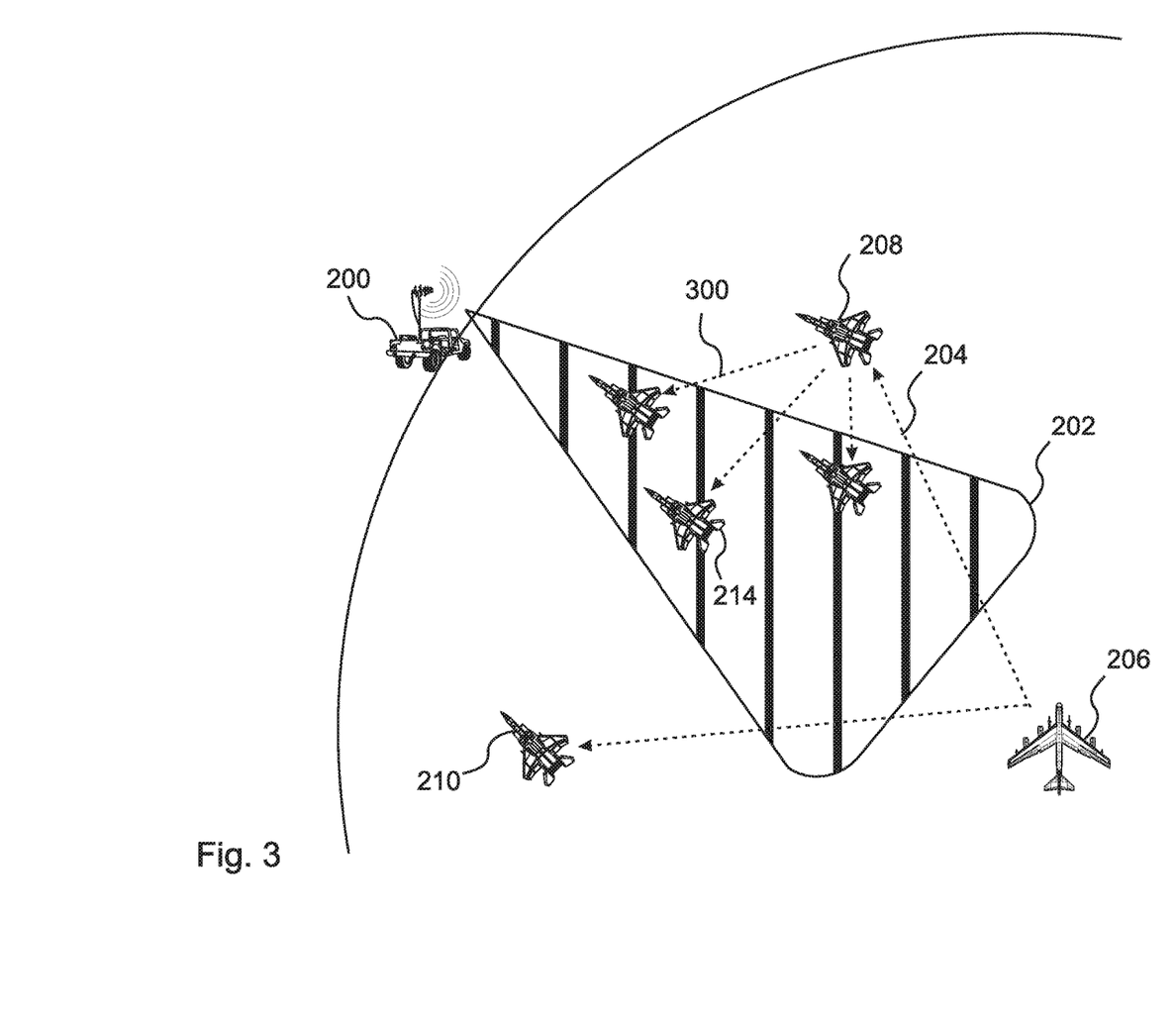
FIG. 3 is a graphical illustration from above of an embodiment of the present disclosure implemented under the conditions illustrated in FIG. 2.

With reference to FIG. 3, the disclosed method overcomes these problems by implementing a dynamic relay assignment ("DRA") approach, whereby conditional relay nodes 206 in the network are assigned to function as relays based on their "quality level" ("QL"), which is a measure of the communication reliability of a node, and also on their proximity to nodes 214 that are considered "disadvantaged," in that they are located within a region of high interference 202 and are experiencing a reduced communications range.

Figure 4:
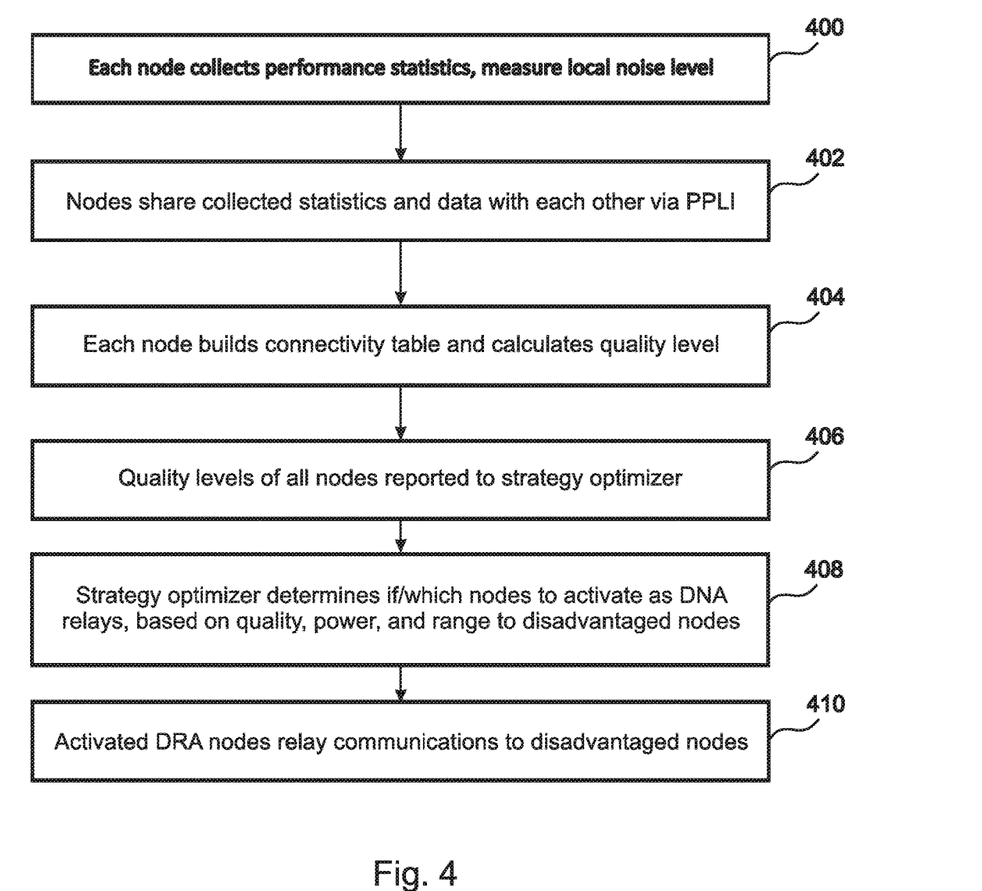
FIG. 4 is a flow diagram that illustrates an embodiment of the disclosed method.

With reference to FIG. 4, in embodiments each node in the network collects statistics on its performance and also makes measurement of the local noise level 400, and then shares this data with other nodes in the network 402, for example via PPLI messages in the case of a Link-16 network. Using data measured locally and data received from other nodes in the network, each node in the embodiment of FIG. 4 builds a connectivity table, and calculates its NQ 404. The NQ scores are combined with other factors, such as the number of disadvantaged nodes in the connectivity matrix, the average range to the disadvantaged nodes, and/or the transmit power level of the local node, to determine a "quality level" ("QL") score for each DRA-capable node, and then the QL scores are compared to each other to determine which, if any, of the nodes should act as a relay platform. In various embodiments, each node in the network provides its NQ score to a "strategy optimizer" ("SO") 406, which then calculates the QL scores and determines which, if any, of the DRA-capable nodes should be assigned to act as a relay 408. The selected nodes (if any), then able 410 to relay transmissions 300 to the disadvantaged nodes 214.

In some of these embodiments, the "quality level" of a node is a function of the NQ and "Relay Quality ("RQ") of the node, the number of active relays in range ("NAR") and the closest node's quality factor ("CNQF").

In embodiments, the NQ of a node depends upon any or all of the following four factors:

the number of non-relayed messages that the node is receiving, the message success rate for non-relayed messages, the average signal-to-noise ratio of non-relayed messages that are received, and/or a measurements of ambient noise.

In some embodiments, at least one of these factors is provided by an Interference Recognizer, such as the one described in co-pending application U.S. Ser. No. 15/479,890, entitled Enhanced Link 16 Sync Detection, incorporated herein by reference in its entirety for all purposes.

In embodiments, the RQ of a node depends on any or all of the following four factors:

Node Quality (Local)

Number of Disadvantaged Nodes

Average Range to Disadvantaged Nodes

Platform Transmit Power Level (200 W or 1000 W for Link-16)

In embodiments where the disclosed DRA functionality is implemented as an extension of a Link-16 network, the Link-16 protocol is extended to include support for exchange between nodes via PPLI messages of the required quality scores and ambient noise measurements, and support is added to the Link-16 protocol for a "DRA" relay mode, in addition to the other three relay modes that are standard in Link-16.

In some Link-16 embodiments, the following statistics are gathered by each node once every 2 seconds and provided to the SO, where each of the statistics is a summation over the last 12 seconds of operation:

Number of messages that could be received (number of receive slot assignments including relay slots, but not including default receive and not including transmit assignments without messages to transmit;

Number of messages successfully received over the last 12 seconds; and

Number of relay messages received (number of fixed format messages received with the relay bit set in the header).

Figure 5:
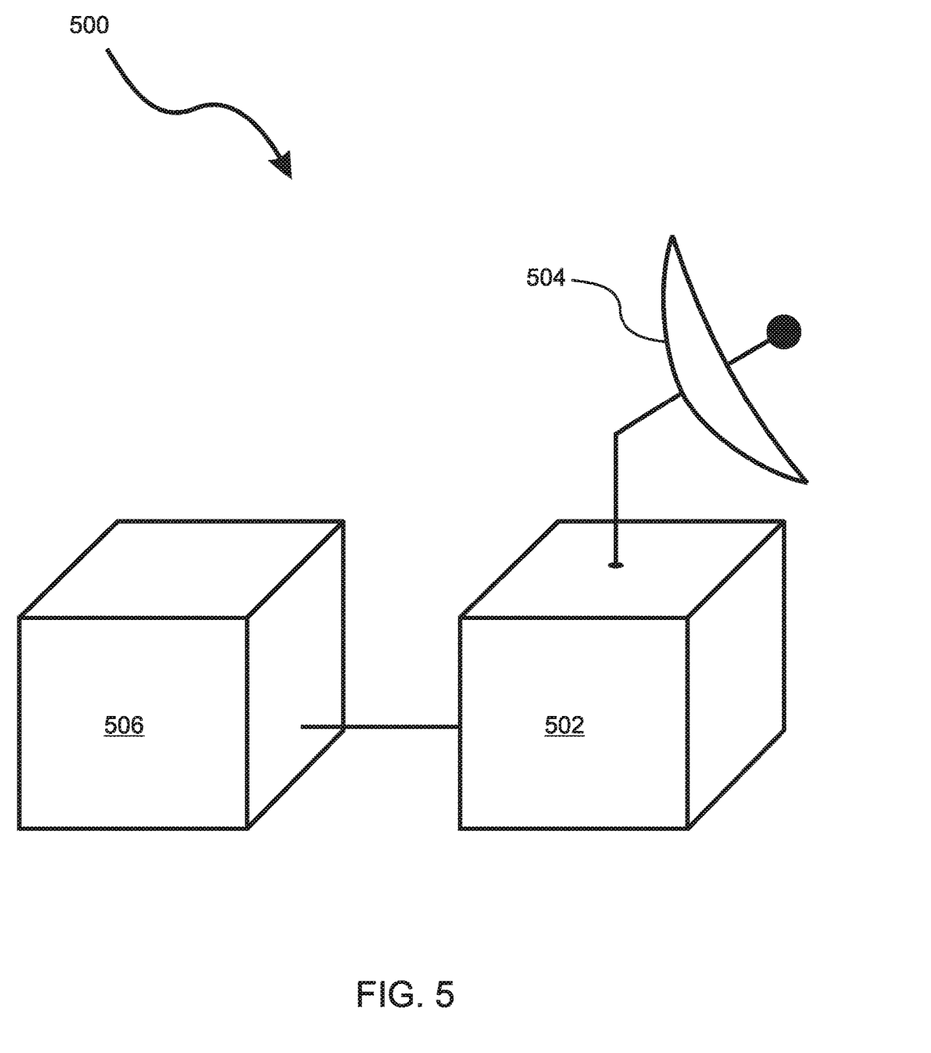
FIG. 5 is a block diagram illustrating an embodiment of the disclosed apparatus.

With reference to FIG. 5, the apparatus disclosed herein 500 includes a transceiver 502 in communication with at least one antenna 504 and configured to receive both relayed and non-relayed messages from other nodes in the network. The apparatus further comprises a processor 506 that controls the operation of the transceiver, performs required calculations and message analysis according to the disclosed method, and provides a user interface for interaction with an operator.

The processor 506 is an instruction execution machine, apparatus, or device and may comprise one or more of a microprocessor, a digital signal processor, a graphics processing unit, an application specific integrated circuit (ASIC), a field programmable gate array (FPGA), and the like. The processor 506 may be configured to execute program instructions stored in a memory and/or data storage (both not shown). The memory may include read only memory (ROM) and random access memory (RAM). The data storage may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

The invention illustratively disclosed herein suitably may be practiced in the absence of any element which is not specifically disclosed herein and is not inherently necessary. However, this specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

What is claimed is:

1. A method of conveying a communication from a transmitting node to a disadvantaged node of a wireless communication network, said disadvantaged node being a node in the network that is subject to localized interference that is present within a jammed region, the method comprising:

for each of a plurality of candidate nodes in the network, collecting by the candidate node of node quality data of the candidate node, the node quality data including statistics on the communication performance of the candidate node and a measured local noise level of the candidate node;

for each of the plurality of candidate nodes in the network, sharing by the candidate node of the node quality data of the candidate node with at least one other of the plurality of candidate nodes in the network;

for each of the plurality of candidate nodes in the network, determining by the candidate node of a node quality of the candidate node using the node quality data of the candidate node and node quality data received from at least one other of the candidate nodes in the network;

for each of the plurality of candidate nodes in the network, determining a quality level of the candidate node, said quality level being dependent at least in part on a communication reliability of the candidate node and a proximity of the candidate node to the disadvantaged node;

according to the quality levels of the candidate nodes, designating a node from among the plurality of candidate nodes as a relay node; and relaying by the relay node of the communication between the transmitting node and the disadvantaged node.

2. The method of claim 1, wherein for each of the candidate notes, the node quality is dependent upon at least one of:

a rate at which the candidate node is receiving messages;

a success rate at which the candidate node is receiving the messages;

an average signal-to-noise ratio of the messages received by the candidate node; and the local noise level of the candidate node.

3. The method of claim 1, wherein for each of the candidate notes, determining the quality level of the candidate node includes determining the node quality of the closest candidate node, where the closest candidate node is the candidate node from among the plurality of candidate nodes that is closest to the transmitting node.

4. The method of claim 1, wherein for each of the candidate notes, determining the quality level of the candidate node includes determining a relay quality of the candidate node, the relay quality being dependent upon at least one of:
the node quality of the candidate node;
a number of disadvantaged nodes in the network;
a distance between the candidate node and the disadvantaged node or, if the network includes a plurality of disadvantaged nodes, an average distance between the candidate node and the plurality of disadvantaged nodes; and
a transmit power of the candidate node.

5. The method of claim 1, wherein determining the quality level of the candidate node includes determining the relay quality of the closest candidate node, where the closest candidate node is the candidate node from among the plurality of candidate nodes that is closest to the transmitting node.

6. The method of claim 1, wherein determining the quality level of the candidate node includes determining how many of the candidate nodes are within a communication range of the transmitting node.

7. The method of claim 1, wherein the network is a Link-16 network.

8. The method of claim 7, further comprising sharing among nodes of the network via PPLI messages of information regarding at least one of:
the local noise levels of the nodes;
statistics regarding rates at which the nodes are receiving messages;
statistics regarding success rates at which the nodes are receiving the messages;
average signal-to-noise ratios of messages received by the nodes;
transmit powers of the nodes; and
relay modes of the nodes.

9. The method of claim 7, wherein for each of the candidate notes, determining the quality level of the candidate node includes providing by an interference recognizer of at least one of a number of received messages, a message success rate, an average signal to noise ratio of received messages, and a measurement of ambient noise of the candidate node.

10. The method of claim 7, wherein the Link-16 network is configured to include dynamic relay assignment ("DRA") as a relay mode applicable to nodes in the network.

11. Non-transitory media containing software operable on nodes in a wireless communications network so as to cause a transmitting node of the network to communicate with a disadvantaged node of the network, said disadvantaged node being a node in the network that is subject to localized interference that is present within a jammed region, the software being configured to cause:
collecting by each of a plurality of candidate nodes in the network of node quality data of the candidate node, the node quality data including statistics on the communication performance of the candidate node and a measured local noise level of the candidate node;
sharing by each of the plurality of candidate nodes in the network of the node quality data of the candidate node with at least one other of the plurality of candidate nodes in the network;
determining by each of the plurality of candidate nodes in the network of a node quality of the candidate node using the node quality data of the candidate node and node quality data received from at least one other of the candidate nodes in the network;
determining for each of the plurality of candidate nodes in the network of a quality level of that candidate node, said quality level being dependent at least in part on a communication reliability of the candidate node and a proximity of the candidate node to the disadvantaged node;
designating of a node from among the plurality of candidate nodes as a relay node, the relay node being selected according to the quality levels of the candidate nodes; and
relaying by the relay node of a communication between the transmitting node and the disadvantaged node.

* * * * *